Oct. 9, 1928.

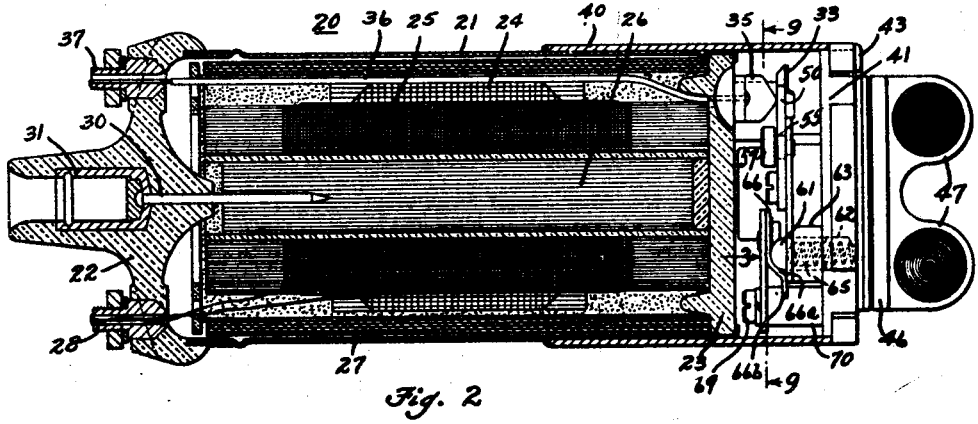

W. A. CHRYST 1,687,058

CONTROLLER LOCK

Filed June 8, 1926 2 Sheets-Sheet 2

Inventor
William A. Chryst
By Spencer Sewall & Hardman
his Attorneys

Patented Oct. 9, 1928.

1,687,058

UNITED STATES PATENT OFFICE.

WILLIAM A. CHRYST, OF DAYTON, OHIO, ASSIGNOR, BY MESNE ASSIGNMENTS, TO DELCO-REMY CORPORATION, OF DAYTON, OHIO, A CORPORATION OF DELAWARE.

CONTROLLER LOCK.

Application filed June 8, 1926. Serial No. 114,563

This invention relates to devices for preventing the theft of an automotive vehicle, and more particularly to those devices which require a key to be inserted in a lock, the lock to be turned by the key and then removed before a member which controls a part of the automobile can be manipulated to render operative some essential part of the automobile, such as the ignition circuit. In this manner, the driver of the automobile is required to remove the key from the lock before the automobile can be set into motion. In some devices of this type, a spring-return locking member is employed so that when the controller, such as the ignition switch handle, is turned to "off" position it will be automatically locked in this position. Since it is necessary to remove the key from the lock before starting the car or engine and the key is not required to lock the car, it is quite unlikely that the driver will re-insert the key into the lock before leaving the car.

Devices for accomplishing these results have heretofore required the driver to move the controller slightly toward "on" position while the key is maintained in unlocked position by the driver, in order that the controller will maintain the lock in unlocking position, and to maintain the controller in such position while the key is removed, and then to move the controller further to position for rendering the automobile operable. This procedure has been found to be very awkward, as it requires the use of both hands of the driver.

One of the objects of the present invention is to accomplish the foregoing results by the means of a controller having a lock so constructed that the driver may insert the key, turn the lock and remove the key before beginning to move the controller handle toward car-operating position. The present invention includes provisions for automatically locking the controller handle in non-operating position simply by turning the handle back to this position.

Further objects of the invention are to provide an ignition coil and switch unit including a lock having the features referred to.

Further objects and advantages of the present invention will be apparent from the following description, reference being had to the accompanying drawings, wherein a preferred form of the present invention is clearly shown.

In the drawings:

Fig. 1 is a front view of a switch and coil unit constructed in accordance with the present invention;

Fig. 2 is a sectional view on the line 2—2 of Fig. 1, and shows the ignition switch in locked position;

Fig. 3 is a view looking in the direction of the arrow 3 in Fig. 2, and shows the ignition switch controlling members in "off" and locked positions;

Fig. 4 is a view similar to Fig. 3, showing the location of the parts after the key has been turned sufficiently to permit turning the controller handle to car-operating position;

Fig. 5 is a sectional view on the line 5—5 of Fig. 4;

Fig. 6 is a view similar to Fig. 3, showing the parts in position after the controller handle has been turned to car-operating position;

Fig. 7 is a sectional view on the line 7—7 of Fig. 6;

Figure 8:
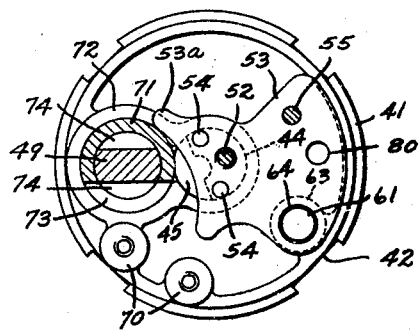
Fig. 8 is a view similar to Fig. 3, certain parts having been removed and others shown in section for sake of clearness.
Figure 9:
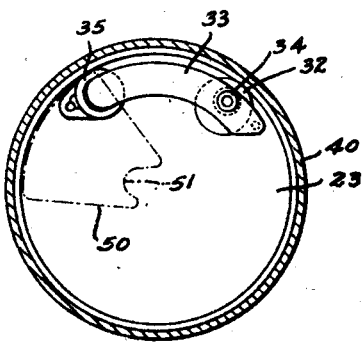
Fig. 9 is an inner end view of the ignition coil, and shows the ignition switch contacts and also the ignition switch case, which is shown in transverse section, this section being taken approximately on the line 9—9 of Fig. 2.
Figure 10:
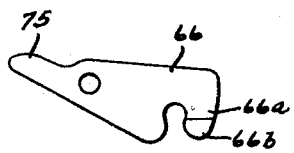
Fig. 10 is a plan view of one of the members of the locking device.

Referring to the drawings, the ignition coil 20, included in the coil and switch unit, comprises a tubular case 21, preferably of metal, which is attached to non-conducting end members 22 and 23 which cooperate with the tube 21 to provide a housing for the ignition primary winding 24, a secondary winding 25, a center core 26 composed of iron wires, and an external core 27 composed of iron plates. One end of the primary winding and one end of the secondary winding are connected at 28 with a primary terminal 29. The other end of the secondary 25 is electrically connected with the core 26, which in turn is connected by a pointed rod 30 with a secondary terminal socket 31. The coil-end-member 23 carries a conductor 32 to which a resilient contact blade 33 is attached by a rivet 34. One end of the primary winding 24 is attached to the conductor 32. The blade 33 engages a switch contact 35 which is attached by wire 36 to a primary terminal 37 carried by the coil-end-member 22. When the switch contacts 33 and 35 are in engagement, a circuit may be completed through the primary coil 24 and its terminals 28 and 37. The switch contact 33 is separated from the contact 35 and is locked in separated position by a mechanism which is housed by a hardened steel tube 40 permanently attached by welding to the coil housing member 21, and by a metal plate 41 having notches 42 which receive the bent-over ears 43 which extend from the tube 40. The plate 41 provides a bearing 44 for a shaft 45 formed integrally with a disc 46 located adjacent the exterior of the plate 41, and provided with a handle 47. The disc 46 is provided with a notch 48 for exposing a key barrel 49 only when the handle 47 is in the open position of the ignition switch. The ignition switch contacts 33 and 35 are separated by a non-conducting plate 50 which is provided with a notch 51 for receiving a portion of a screw 52 which provides a fulcrum for the plate 50. The screw 52 passes through a metal plate 53 and threadedly engages the shaft 45. Dowel pins 54 extend from the shaft 45 into similarly-spaced holes in the plate 53. Thus the plate 53 is rotated by turning the handle 47.

The plate 53 carries a stud 55 having its shank passing through an arcuate slot 56 provided in the contact separator 50. The head 57 of the stud 55 overlies the separator 50 and maintains the same in position. Thus the plate 53 provides a carrier for the contact separator 50 and a portion of the device for locking the separator in position for separating the contact 33 from the contact 35.

The plate 53 is locked in switch-open position by a plunger 61 which is slidably supported by a recess 62 provided in a boss 63 which is formed integrally with the plate 41. When the plate 53 is in the position shown in Figs. 2 and 8, the plunger 61 will extend through a hole 64 provided in the plate 53, and a spring 65 will yieldingly urge the plunger 61 against a lever 66. Lever 66 is pivoted upon a pin 67 attached to a plate 68 which is attached by screws 69 to two posts 70 extending from the plate 41 and integral therewith. The lever 66 is located between the plate 68 and the plate 53. Lever 66 includes a plunger-camming portion 66ª and a plunger-retaining portion 66ᵇ. The key barrel 49 is rotatable within a lock cylinder 71 which is supported by an apertured boss 72 provided by the plate 41. The tubular wall of the cylinder 71 is cut away to provide a recess at 73 (see Fig. 8) for receiving a portion of the plate 68 which, when assembled as shown in the drawings, will prevent endwise movement of the cylinder 71 and, hence, removal of the lock. The lock including the key barrel 49 and the cylinder 71 may be any standard make of lock which permits removal of the key from the key barrel after the barrel has been turned 180° by the key. As shown in Fig. 8, the key barrel 49 is notched at 74 in order to receive the end 75 of the lever 66 when it is in the position shown in Figs. 2 and 3.

When the plate 50 occupies the position shown in Fig. 3, it will be located between the contacts 33 and 35 in order to interrupt the ignition circuit. The handle 47 cannot be turned in order to remove the separating plate 50 from the switch contacts, since the plunger 61 extends through the hole 64 in the plate 53. To unlock the switch, a suitable key is inserted in the lock barrel 49 and the key is turned 180°. During this movement of the barrel 49, a portion of its cylindrical surface will engage the lever-end 75, as shown in Fig. 4, thus causing the lever 66 to move in a counterclockwise direction from the position shown in Fig. 3 to that shown in Fig. 4. During this movement of the lever 66, it will have moved relative to the plunger 61 from the position shown in Fig. 2 to that shown in Fig. 5, the camming portion 66ª engaging the hemispherical end of the plunger 61 in order to move said plunger farther into the recess 62 and to bring its upper end, as viewed in Fig. 5, substantially flush with the upper surface of the plate 53 and into contact with the plunger-retaining portion 66ᵇ of the lever 66. The plunger 61 and the lever 66 will be maintained in the position shown in Fig. 5, due to friction resulting from pressure exerted by the spring 65.

The plunger 61 is now in a position which will permit turning the plate 53 by the handle 47, but the handle 47 cannot be turned until after the key is removed from the key barrel 49. After the barrel 49 has been moved to produce the said movement of the lever 66 and into a position permitting removal of the key, the key is removed from the barrel in order to leave the disc 46 unobstructed. The handle 47 is turned in a counterclockwise direction, as viewed in Fig. 1, in order to turn the plate 53 in a clockwise direction, as viewed in Fig. 3, so that the plate will be moved from the position shown in Fig. 3 to that shown in Fig. 6. While the separator 50 remains between the switch contacts 33 and 35, the stud 55 will move relative to the plate 50 until it engages the lower end of the notch 56, as viewed in Fig. 3. Then the separator 50 will move with the plate 53 and be retracted from the switch contacts, permitting the switch to close. The plate 53 is turned in this direction until one of its arms 53ª bears against the lock cylinder 71, which serves as a stop limiting the movements of the member 53. As the stud 55 is moved in a clockwise direction, its head 57 will engage the lever 66 and will move it from the position shown in Fig. 4 to that shown in Fig. 6, thus moving its plunger-retaining portion 66$^b$ out of alignment with the plunger 61, as shown in Fig. 7. The plate 53 is yieldingly maintained in the position shown in Fig. 6 by the plunger 61 which is pressed by the spring 65 into a hole 80 of smaller diameter than the plunger 61. Thus the plunger 61 serves as a detent for yieldingly maintaining the plate 53 in switch-open position, as well as operating to lock the plate 53 in switch-closing position.

To open the ignition circuit, the handle 47 is turned clockwise, as viewed in Fig. 1, in order to rotate the plate 53 counterclockwise from the position shown in Fig. 6 to that shown in Fig. 3. This movement of the plate 53 causes the separator 50 to be moved between the switch contacts 33 and 35, and brings the hole 64 into alignment with the plunger 61, so that the plunger will be moved by the spring through the plate 53 into the position shown in Fig. 2. Thus the plate 53 is locked automatically in switch-open position.

The lost-motion connection between the plate 53 and the contact separator 50 is desirable, since the required motion of the plate 53 is greater than the required motion of the separator 50. The handle 47 may be moved slightly away from its switch-closing position without affecting the switch. Therefore, the ignition circuit will not be broken by a slight accidental movement of the switch handle 47.

While the present invention is disclosed in combination with an electric switch, it is obvious that the invention is not so limited, but may be used to control other parts of an automobile or its engine. The present invention, however, is adapted to be incorporated in a unitary structure including an ignition switch and coil, said structure being compact in arrangement and readily adapted to be mounted upon the instrument board of an automobile.

While the form of embodiment of the invention as herein disclosed, constitutes a preferred form, it is to be understood that other forms might be adopted, all coming within the scope of the claims which follow.

What is claimed is as follows:

1. A controller lock comprising, in combination, a movable controlling member having "on" and "off" positions, a locking bolt engageable with the member to prevent movement thereof, a spring urging the bolt into locking position, a key operated device for moving the bolt into non-locking position and for retaining it in said position, the key being removable while the device remains operative, and means operated in response to movement of the member to "on" position for moving the device to inoperative position, the member having a portion for maintaining the bolt in non-locking position when the member is moved away from "off" position.

2. A controller lock comprising, in combination, a controlling member movable to "on" and "off" positions, a locking bolt retained in unlocking position when the member is in "on" position and automatically movable into locking position, upon movement of the member into "off" position, a key operated device for moving the bolt to unlocking position and having a part cooperating with the bolt for holding the device in bolt-retaining position, and means operated by movement of the member into "on" position for rendering the device non-operative.

3. A controller lock comprising, in combination, a plate movable into "on" and "off" positions and having a recess, a spring urged locking bolt movable into the recess when the plate is in "off" position for preventing movement of the plate and having an end portion adapted to cooperate with the plate so that the plate may move the bolt out of said recess when said end portion is moved into said recess, a key operated device for moving said bolt end within said recess and for retaining the bolt in said last mentioned position after the key is withdrawn, and means operated by movement of the plate to "on" position for moving the key operated device to non-operating position whereby the plate will be automatically locked by the bolt when the plate is moved to "off" position.

4. A controller lock comprising, in combination, a manually operated member having a plurality of positions, a spring actuated member engageable with the manual member for locking it in one of its positions, a key operated device for moving the spring actuated member from locking engagement with the manual member, said device being retained in position to hold the spring actuated member in non-locking position due to direct engagement of the key operated device and the spring actuated member, means operated by movement of the manual member into another of its positions for retaining the spring actuated member in non-locking position independent of the key operated device, and means responsive to the movement of the manual member into said other position for causing the key operated device to be separated from the spring actuated member, whereby, when the manual member is moved into the first position, the spring actuated member will be released to lock the manual member.

5. A controller lock according to claim 4 and having a lock comprising a key receiving member for moving the key actuated device only into its position for retracting the spring actuated member from locking position, the key actuated device being yieldingly retained in said position by virtue of its engagement with the spring actuated member, whereby the key receiving member can be moved to key removable position before moving the manual member.

6. A controller lock according to claim 4 and having a lock permitting removal of the key while the key operated device is retained in engagement with the spring actuated member, and having a member operatively connected with the manual member for obstructing movement of the latter unless the key is removed from the lock.

7. A controller lock according to claim 4 and having a lock permitting removal of the key while the key operated device is retained in engagement with the spring actuated member, and having a disc operatively connected with the manual member and so constructed as to expose the keyhole only when the manual member is in one of its positions, whereby the key must be removed before the manual member can be moved into another of its positions.

8. A controller lock comprising, in combination, a manually operated member having a plurality of positions, a spring actuated member engageable with the manual member for locking it in one of its positions, a key operated device for moving the spring actuated member from locking engagement with the manual member and for retaining the spring actuated member in non-locking position, a part provided by the manual member when the latter is moved into another of its positions for engaging the spring actuated member to retain it in non-locking position independent of the key operated device, a part carried by the manual member for directly engaging the key operated device to move said device into non-operating position when the manual member is moved into said other position, whereby, when the manual member is moved into the first position, the spring actuated member will be released to lock the manual member.

9. A controller lock comprising in combination, a rotatable manually operable member, means for locking the manual member in one of its positions and including a key receiving member offset from the axis of the manual member, and a plate carried by the manual member and having an aperture exposing the keyhole only when the manual member is in the position in which it is to be locked.

10. A controller lock comprising in combination, a rotatable manually operable plate member having two apertures of different diameters equidistant from its axis of rotation, a spring pressed plunger having rounded end and of less diameter than one of said apertures and of greater diameter than the other, the rounded end being movable through the larger aperture to lock the plate, and movable into the smaller aperture to resiliently hold the plate in a certain other position, a key operated device for engaging the rounded end of the plunger to move said end flush with one side of the plate whereby the plunger will only resiliently hold the plate in the position in which it may be locked, and a part carried by the plate for separating the key operated device from the plunger when the plate is moved into such position that the smaller aperture of the plate may receive the end of the plunger, whereby, when the plate is returned to the position in which it may be locked, the plunger will move through the larger aperture to lock the plate.

11. A controller lock according to claim 10 in which the key operated device comprises a lever, a key receiving shaft for engaging the lever and having two positions of key removal, and a lock cylinder supporting the shaft, the shaft having diametrically opposite notches each for receiving the shaft-engaging end of the lever when the lever is separated from the plunger in order that, in either key-removal position of the shaft, the lever may be moved by the manually operable plate.

12. A controller lock according to claim 10 in which the key operated device comprises a lever, a key receiving shaft for engaging the lever, and a lock cylinder supporting the shaft, and in which the lock is supported by a case to which is attached a plate pivotally supporting the lever and received by a notch in the cylinder to prevent removal of the cylinder from the case.

In testimony whereof I hereto affix my signature.

WILLIAM A. CHRYST.